(12) United States Patent
Syed

(10) Patent No.: US 6,858,672 B2
(45) Date of Patent: Feb. 22, 2005

(54) SAFE PROCESS FOR MAKING POLYMERS CONTAINING N-PHENYLIMIDE GROUPS

(75) Inventor: Abuzar Syed, Bear, DE (US)

(73) Assignee: Basell Poliolefine Italia S.p.A., Milan (IT)

( * ) Notice: Subject to any disclaimer, the term of this patent is extended or adjusted under 35 U.S.C. 154(b) by 176 days.

(21) Appl. No.: 10/177,776

(22) Filed: Jun. 20, 2002

(65) Prior Publication Data

US 2003/0236356 A1 Dec. 25, 2003

(51) Int. Cl.$^7$ ............................ C08F 8/32; C08F 255/02
(52) U.S. Cl. ............................. 525/64; 525/66; 525/69; 525/178; 525/379
(58) Field of Search .............................. 525/64, 66, 69, 525/178, 379

(56) References Cited

U.S. PATENT DOCUMENTS

| | | | |
|---|---|---|---|
| 3,998,907 A | 12/1976 | DeGiulio | 260/857 L |
| 4,246,374 A | 1/1981 | Kopchik | 525/329 |
| 4,742,123 A | 5/1988 | Kopchik | 525/329.7 |
| 4,891,405 A | 1/1990 | McCready | 525/64 |
| 5,140,074 A | 8/1992 | DeNicola, Jr. et al. | 525/263 |
| 5,430,115 A | 7/1995 | Toyooka et al. | 526/262 |
| 5,478,903 A | 12/1995 | Fujioka et al. | 526/262 |
| 5,565,537 A | 10/1996 | Uda et al. | 526/262 |
| 5,618,926 A | 4/1997 | Salamone et al. | 530/403 |
| 5,652,297 A | 7/1997 | McCulloch et al. | 524/555 |
| 5,652,317 A | 7/1997 | McCulloch et al. | 526/312 |
| 6,140,425 A | 10/2000 | DeNicola, Jr. et al. | 525/293 |

FOREIGN PATENT DOCUMENTS

| | | |
|---|---|---|
| EP | 0076691 | 4/1983 |
| EP | 0503797 | 9/1992 |

OTHER PUBLICATIONS

T. Oishi et al., "Synthesis and Polymerization of N–[4–N'–(α–Methylbenzyl)aminocarbonylphenyl]–maleimide," Journal of Polymer Science, Part A: Polymer Chemistry, vol. 30, p. 1821–1830 (1992).

M. Hocking et al., "Water–Soluble Imide–Amide Copolymers. II. Preparation and Characterization of Poly(acrylamide–co–p–Maleimidobenzoic Acid)," Journal of Polymer Science, Part A: Polymer Chemistry, vol. 28, p. 2969–2982 (1990).

*Primary Examiner*—Jeffrey Mullis

(57) ABSTRACT

Polymers containing N-phenylimide groups are made by reacting polymers containing succinic or glutaric anhydride groups with a substituted or unsubstituted aminobenzoic acid in a devolatilizing extruder at a barrel temperature of about 180° to about 320° C., whereby complete decarboxylation takes place during the formation of the N-phenylimide groups.

5 Claims, 8 Drawing Sheets

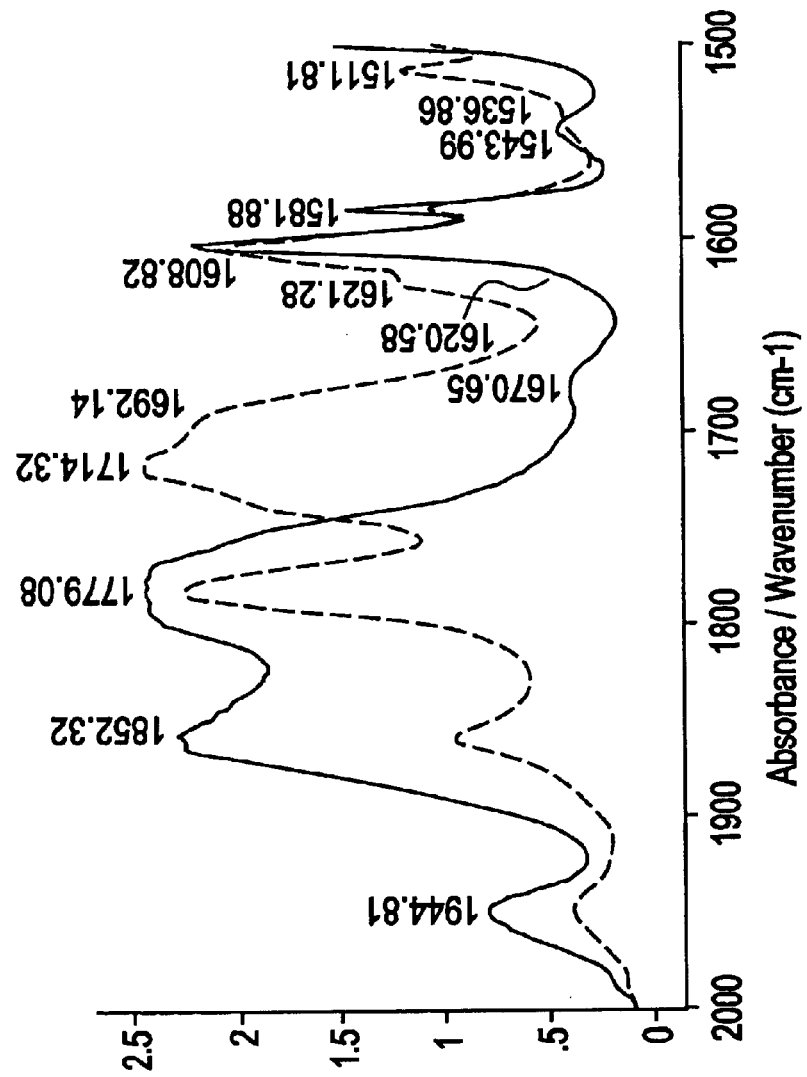

US 6,858,672 B2

SAFE PROCESS FOR MAKING POLYMERS CONTAINING N-PHENYLIMIDE GROUPS

FIELD OF THE INVENTION

This invention relates to a process for making polymers containing N-phenyl imide groups.

BACKGROUND OF THE INVENTION

Copolymers of styrene and maleic anhydride (SMA) are known to have good heat resistance and are widely used in commercial applications requiring good performance at elevated temperatures. The thermal stability and weatherability of the SMA copolymers are further improved by converting the anhydride groups to the corresponding imide groups by reacting with aliphatic and aromatic primary amines, either in solution or in the melt (reactive extrusion), and by direct polymerization of N-substituted or unsubstituted maleimides.

A similar effort has been made to convert poly(methyl methacrylate)- or polymethacrylic anhydride-containing polymers to their corresponding N-substituted methacrylimides to improve thermal stability, processability, strength and modulus, as well as weatherability.

In general, polymers containing maleimide and methacrylimide groups are found to be miscible with a number of engineering thermoplastics. In particular, styrene/N-phenylmaleimide copolymers are finding commercial applications in blends with ABS to improve the thermal stability, melt flow rate and heat distortion temperatures and the ability to mold a thinner gauge material with reduced cycle times. These thermally resistant ABS grades are expected to expand markets for ABS by effectively competing with other engineering thermoplastics such as PPE. Due to the improved compatibility of the ABS blends with a wide range of thermoplastics, it is expected to be of interest to enhance the thermal resistance of PVC, polycarbonate, and polyamides.

Aniline, a primary aromatic amine, is a hazardous carcinogenic liquid. It is difficult to handle aniline safely during reactive extrusion, which is the most economical way to produce imides on a large scale. Often maleic anhydride is reacted with aniline to obtain the N-phenylmaleimide monomer, which is then copolymerized with other monomers in solution or emulsion polymerization processes.

For example, U.S. Pat. No. 3,998,907 discloses a method for producing rubber-modified styrene/N-phenylmaleimide in aqueous suspension by heating a mixture of styrene/maleic anhydride, an elastomer and aqueous ammonia or an aqueous amine such as aniline, ethanolamine, benzylamine, and alkyl amines. U.S. Pat. No. 4,742,123 discloses non-crosslinked polymer compositions having glutaric anhydride units made by devolatilizing a (meth)acrylic acid-containing polymer or copolymer in an extruder to form the anhydride and then adding ammonia, an ammonia generator or a primary amine. U.S. Pat. No. 5,478,903 discloses the production of N-phenylmaleimide-containing copolymers in solution by direct copolymerization of N-phenylmaleimide with other monomers and organic peroxide, followed by solvent removal. U.S. Pat. No. 4,246,374 describes a method for making imidized acrylic polymers by reacting a polymer containing units derived from esters of acrylic or methacrylic acid with ammonia or a primary amine such as aniline, p-aminobenzoic acid or an alkylamine under anhydrous conditions in an extruder while applying subatmospheric pressure.

U.S. 4,891,405 discloses moldable blends of styrene-maleic anhydride copolymer, polybutylene terephthalate ester, and styrene-maleimide copolymer having pendant carboxyl or hydroxyl groups. The styrene-maleimide copolymer with pendant groups is made by modification of a styrene-maleic anhydride copolymer with an amino acid or ester by refluxing with azeotropic removal of water in a solvent.

There is still a need for a simpler and safer method to produce copolymers containing N-phenylsuccinimide or N-phenylmethacrylimide units by reactive extrusion without employing hazardous materials such as aniline.

SUMMARY OF THE INVENTION

The process of this invention for making polymers containing N-phenylimide groups comprises reacting polymers containing succinic or glutaric anhydride groups with a substituted or unsubstituted aminobenzoic acid in a devolatilizing extruder at a barrel temperature of about 180° to about 320° C., whereby complete decarboxylation takes place during formation of the N-phenylimide groups.

p-Aminobenzoic acid is a solid (melting point 188° C.) that is easy to handle and safe to use in reactive extrusion processes. Polymers containing N-phenylimide groups are produced that are similar to those produced using aniline as the amine reactant.

BRIEF DESCRIPTION OF THE DRAWINGS

FIG. 5 shows the superimposed IR spectra of Compounds 6 and 7 including the region of carbonyl absorption.

DETAILED DESCRIPTION OF THE INVENTION

Figure 1:
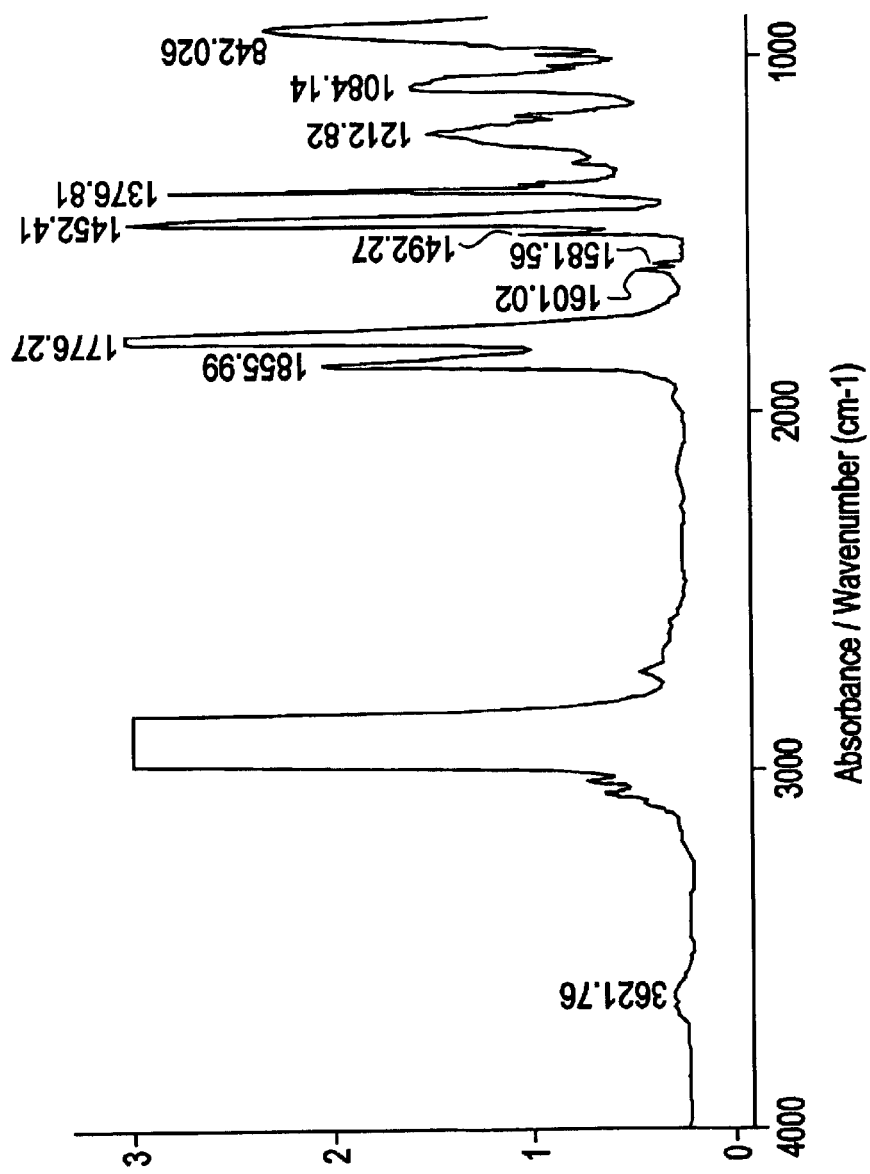
FIG. 1 shows the infrared (IR) spectrum of polypropylene grafted with poly(styrene/α-methylstyrene/succinic anhydride) (Compound 1).

The process of this invention for preparing polymers containing N-phenylimide groups comprises reacting polymers containing succinic and glutaric anhydride groups with a substituted or unsubstituted aminobenzoic acid in a devolatilizing extruder at a barrel temperature of about 180° to about 320° C., whereby complete decarboxylation takes place during formation of the N-phenylimide groups. Any number of polymers containing anhydride groups can be used, such as, for example, polypropylene grafted with poly(styrene/α-methylstyrene/maleic anhydride), polypropylene grafted with poly(glutaric anhydride), a styrene/maleic anhydride copolymer, polypropylene grafted with a styrene/maleic anhydride copolymer, an acrylic ester/maleic anhydride copolymer, and an acrylonitrile or methacrylonitrile/maleic anhydride copolymer.

The benzene ring of the aminobenzoic acid can be substituted by, for example, alkyl and alkoxy groups. These compounds are commercially available. However, the substituents are not limited to alkyl and alkoxy groups. p-Aminobenzoic acid is preferred.

During the imidization reaction, the carboxylic acid group of the aminobenzoic acid undergoes complete decarboxylation to give unsubstituted N-phenylimide groups. To avoid generation of colored amine oxidation products at high temperatures, the compounding is carried out under a nitrogen atmosphere.

The advantages of using this process are: (a) avoiding the handling of liquid aniline, a very hazardous and carcinogenic material, (b) ease of handling solid p-aminobenzoic acid, and (c) p-aminobenzoic acid is safe to use and no special personal protective equipment is needed in comparison to what is needed for handling aniline.

In this specification, all parts and percentages are by weight unless otherwise noted.

EXAMPLE 1

This example describes the preparation of polypropylene grafted with poly(styrene/α-methylstyrene/N-phenylsuccinimide) (Compound 2).

Polypropylene grafted with poly(styrene/α-methylstyrene/succinic anhydride) (Compound 1) was produced by free radical initiated graft polymerization of polypropylene, styrene, α-methylstyrene, and maleic anhydride using the method described in U.S. Pat. No. 5,140,074, which is incorporated herein by reference. The terpolymer product contained about 53% propylene homopolymer, about 19.5% polystyrene, about 10.5% poly(α-methylstyrene), and about 17% succinic anhydride.

The graft terpolymer (776.4 g, containing 132 g succinic anhydride) was hand blended with 804 g of high stiffness, broad molecular weight distribution propylene homopolymer (BMWD PP), commercially available from Basell USA Inc. and 183 g 4-aminobenzoic acid, 0.1 wt. % calcium stearate, and 0.4 weight % Irganox B225 antioxidant, commercially available from Ciba Specialy Chemicals Corporation. Irganox B225 antioxidant is a blend of 1 part Irganox 1010 antioxidant and 1 part Irgafos 168 tris(2,4-t-butylphenyl) phosphite. The BMWD PP was added to adjust the effective add level of anhydride groups per hundred parts of propylene homopolymer.

The blend was extruded using a co-rotating, intermeshing, twin screw 34 mm Leistritz extruder. The extruder was equipped with a vacuum port to remove the water vapor given off during the imidization reaction. The barrel temperature was 230° C., the screw speed 300 RPM and the feed rate 25 lb (11.35 kg)/hr. A nitrogen purge was used throughout the process to minimize air oxidation of the amine.

To minimize unreacted anhydride groups, the blend was mixed with additional 4-aminobenzoic acid (50 g) and re-extruded.

Figure 2:
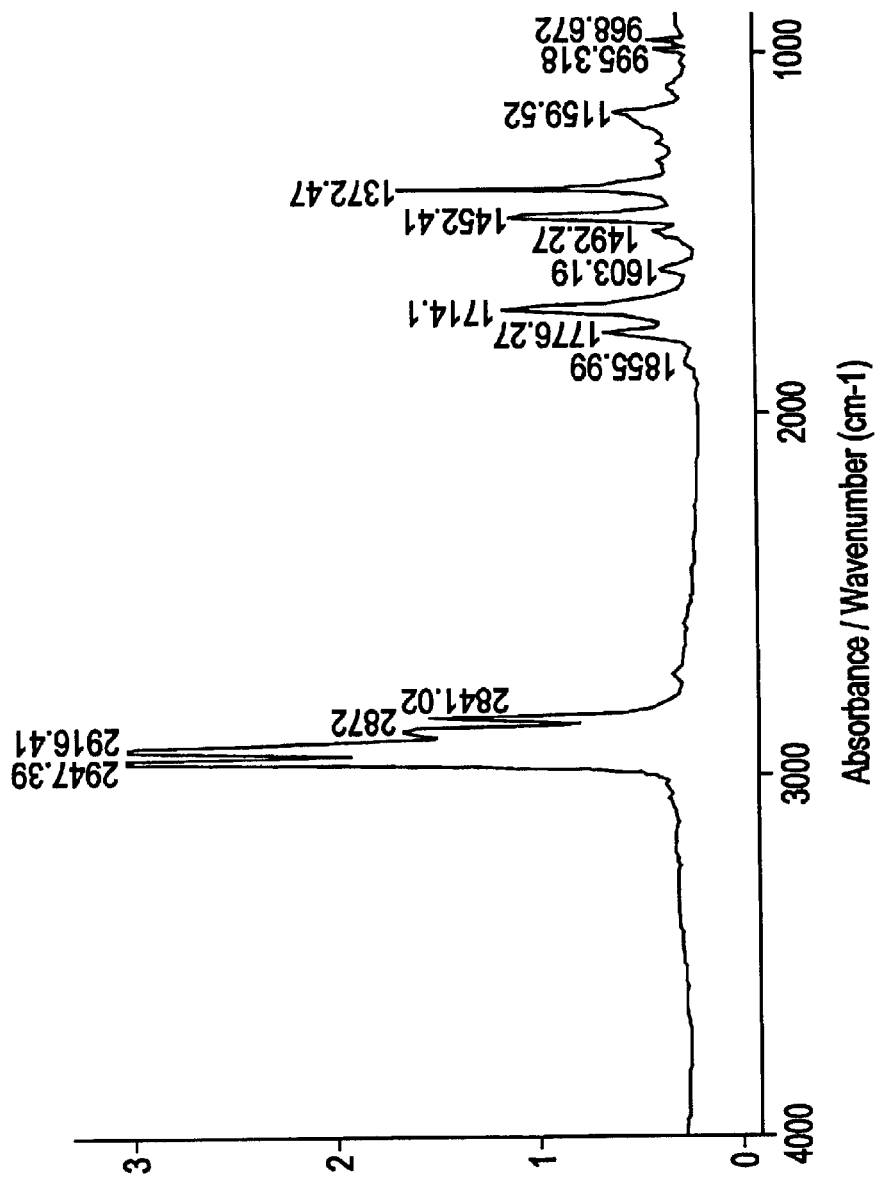
In FIG. 2 shows the IR spectrum of polypropylene grafted with poly(styrene/α-methylstyrene/N-phenylsuccinimide) (Compound 2).

The dried pellets were ground and washed with methanol several times to remove any unreacted 4-aminobenzoic acid. The washed and dried pellets were pressed into a thin film (~1 mil), which was analyzed by infrared spectroscopy for anhydride-to-imide conversion (see FIGS. 1 and 2).

In Compound 1, the peaks due to succinic anhydride stretching vibrations (FIG. 1) were at 1776.3 cm$^{-1}$ (major) and 1856 cm$^{-1}$ (minor). After reaction with 4-aminobenzoic acid in the extruder, the new sharp peaks due to the imide group emerged (FIG. 2) at 1714 cm$^{-1}$ (major) and 1776 cm$^{-1}$ (minor). The unreacted anhydride group could also be seen at 1856 cm$^{-1}$ (merged with the imide peak).

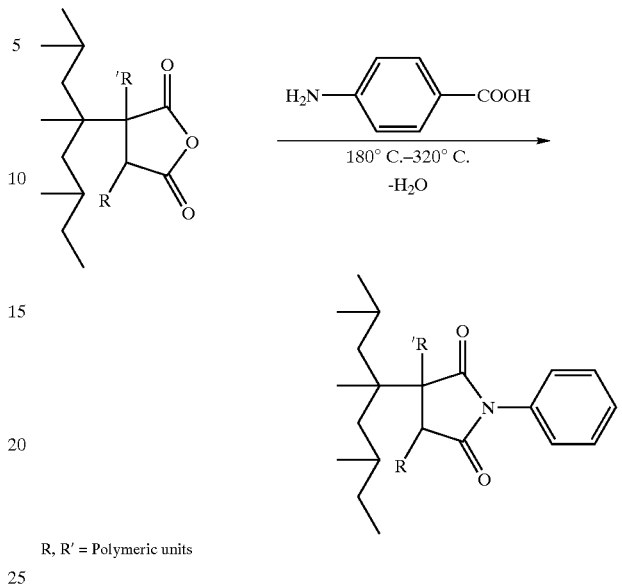

R, R' = Polymeric units

EXAMPLE 2

This example describes the preparation of polypropylene grafted with poly(glutaric N-phenylimide) (Compound 5).

Polypropylene grafted with poly(methacrylic acid) (Compound 3) was produced by free radical-initiated graft polymerization of polypropylene and methacrylic acid using the procedure described in U.S. Pat. No. 5,140,074. The graft copolymer contained about 53% propylene homopolymer and about 47% poly(methacrylic acid).

The polypropylene-g-poly(methacrylic acid) (68% by wt.) was blended with high stiffness, broad molecular weight distribution propylene homopolymer (32%), commercially available from Basell USA Inc., 0.1% calcium stearate, and 0.4% Irganox B225 antioxidant. The blend was compounded on a 34 mm Leistritz twin screw extruder as described in U.S. Pat. No. 6,140,425, which is incorporated herein by reference. The conversion of acid to anhydride groups in the extruder was not complete due to the short residence time. The IR spectrum of Compound 4 in FIG. 3 clearly indicates the presence of unreacted acid groups at 1701.4 cm$^{-1}$, along with the peaks due to anhydride groups at 1753.4 cm$^{-1}$ and 1801 cm$^{-1}$.

The polypropylene-g-poly(glutaric anhydride) (1090 g containing ~160 g glutaric anhydride) (Compound 4) was hand blended with additional high stiffness, broad molecular weight distribution propylene homopolymer (486 g) and 4-aminobenzoic acid (142 g), 0.1% calcium stearate, and 0.4% Irganox B225 antioxidant. The blend was extruded using a co-rotating, intermeshing, twin screw 34 mm Leistritz extruder. The extruder was equipped with a vacuum port to remove the water vapor given off during the imidization reaction. The barrel temperature was 230° C., the screw speed 300 RPM, and the feed rate 25 lb (11.35 kg)/hr. A nitrogen purge was used throughout the process to minimize air oxidation of the amine.

In order to minimize unreacted anhydride groups, the blend (2.5 lb) was mixed with additional 4-aminobenzoic acid (50 g) and re-extruded.

The dried pellets were ground and washed with methanol several times to remove any unreacted 4-aminobenzoic acid.

Figure 3:
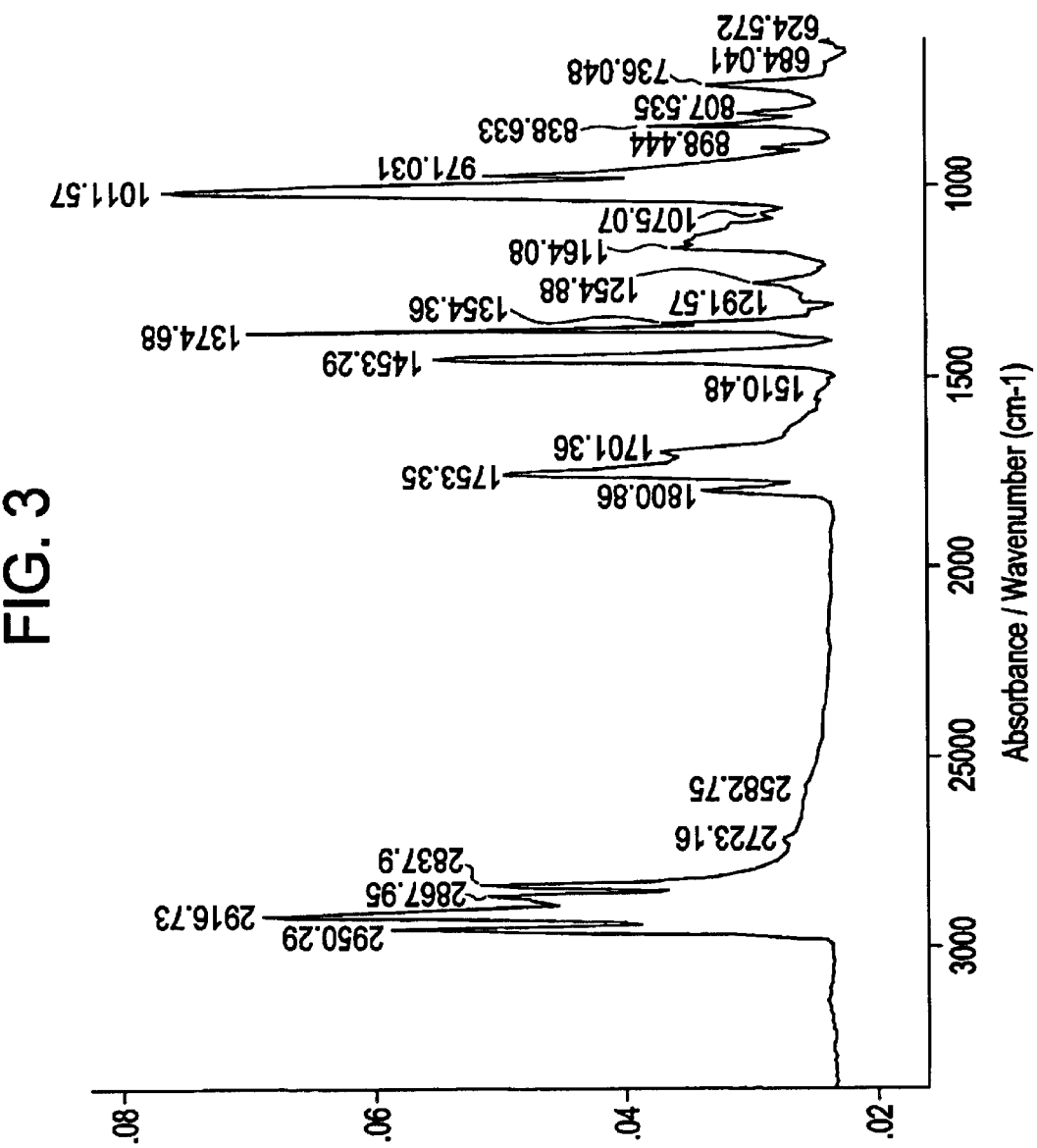
FIG. 3 shows the IR spectrum of polypropylene grafted with poly(glutaric anhydride) (Compound 4).
Figure 4:
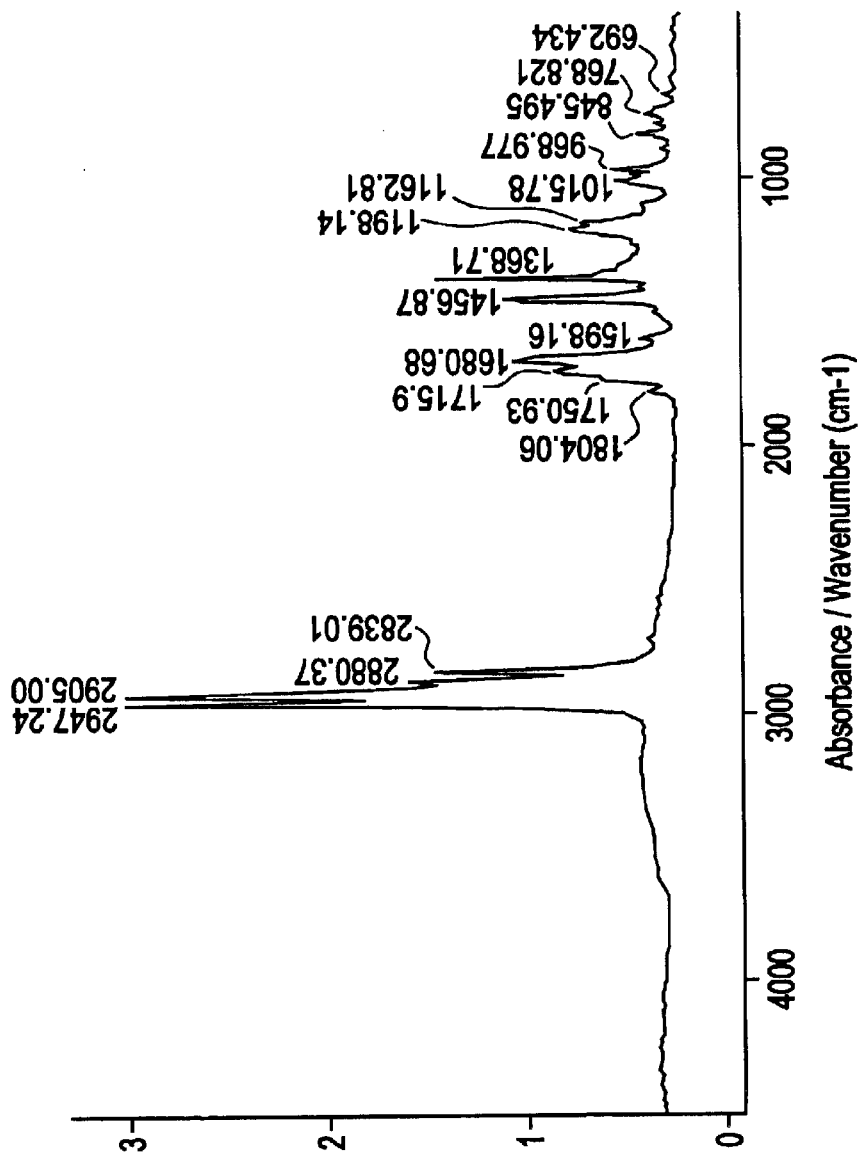
FIG. 4 shows the IR spectrum of polypropylene grafted with poly(gutaric N-phenylimide) (Compound 5).

The washed and dried pellets were pressed into a thin film (~1 mil), which was analyzed by infrared spectroscopy for anhydride-to-imide conversion (FIG. 3 and 4).

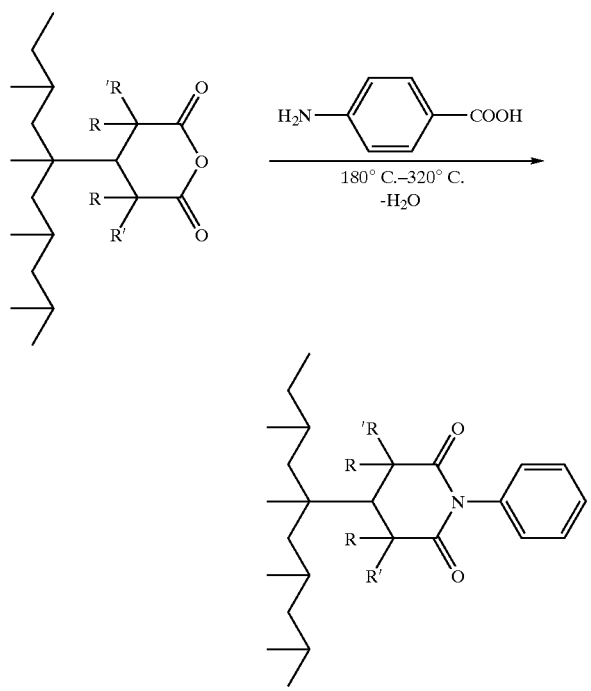

R = H, CH$_3$, C$_2$H$_5$
R' = Polymeric units

As described earlier, in Compound 4, the peaks due to glutaric anhydride stretching vibrations (FIG. 3) were at 1753.4 cm$^{-1}$ (major) and 1801 cm$^{-1}$ (minor). After reaction with 4-aminobenzoic acid in the extruder, the new sharp peaks due to the glutarimide group emerged (FIG. 4) at 1682 cm$^{-1}$ (major) and 1725 cm$^{-1}$ (minor). The peaks due to unreacted glutaric anhydride groups could also be seen at 1755.6 cm$^{-1}$ and 1801 cm$^{-1}$. No additional peaks due to aromatic acid vibration could be detected. The residual acid peak from Compound 4 disappeared, possibly converted to an anhydride group.

EXAMPLE 3

This example provides evidence that succinic anhydride groups are converted to N-phenylsuccinimide groups and not N-phenylsuccinimide-4-carboxylic acid groups.

The stretching vibrations due to a 5-membered anhydride group (Compound 1) shifted from 1776 and 1856 cm$^{-1}$ (FIG. 1) to 1714 cm$^{-1}$ and 1776 cm$^{-1}$ (FIG. 2) after imide formation (Compound 2).

The peak for stretching vibration of aromatic carboxylic acid from 4-aminobenzoic acid, if present, was expected around 1700 cm$^{-1}$ but it was missing, indicating that decarboxylation had occurred during reactive extrusion. The peak for imide at 1712 cm$^{-1}$ was a sharp one and it does not appear that it overlapped with the aromatic carboxylic acid peak. This was further confirmed by comparing with the IR spectrum of N-phenylglutarimide.

EXAMPLE 4

This example provides evidence that glutaric anhydride groups were converted to N-phenylglutarimide groups and not N-phenylglutarimide-4-carboxylic acid groups (Compound 4 converted to Compound 5).

The stretching vibrations due to a 6-membered anhydride group (Compound 4) shifted from 1753.4 and 1801 cm$^{-1}$ (FIG. 3) to 1682 cm$^{-1}$ and 1725 cm$^{-1}$ (FIG. 4) after imide formation (Compound 5). The unreacted anhydride peaks can also be detected here. However, the unreacted acid peak at 1701.4 cm$^{-1}$ that was present in the 6-membered anhydride group (Compound 4) also disappeared, possibly by conversion to an anhydride group.

Figure 5:
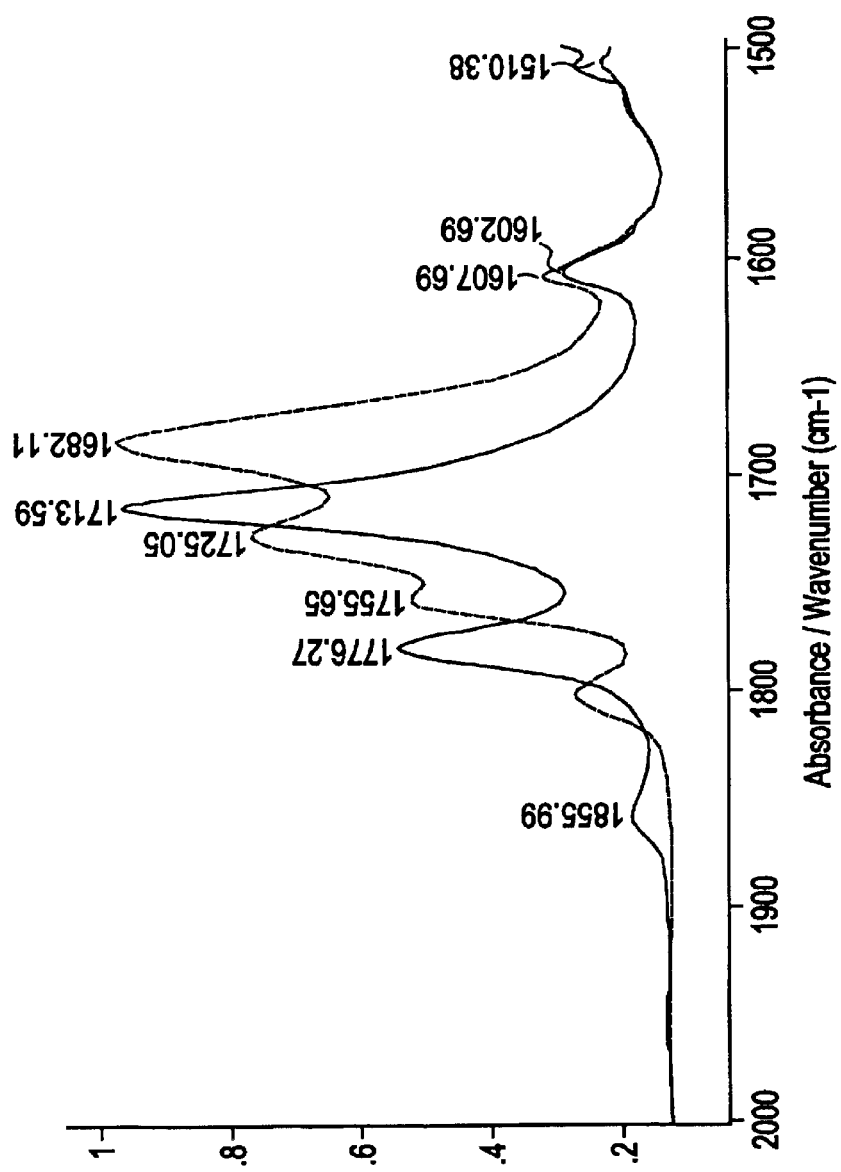
FIG. 5 shows the superimposed IR spectra of the carbonyl region of compounds 2 and 5.

The peak due to the stretching vibrations of aromatic carboxylic acid was expected to be around 1700 cm$^{-1}$. Due to the shift of peaks due to imide groups in 5-membered (Compound 2) and 6-membered rings (Compound 5) from 1714 cm$^{-1}$ to 1682 cm$^{-1}$, the peak due to stretching vibration of aromatic acid groups, if present, should have been easily detected around 1700 cm$^{-1}$. The carbonyl region of Compounds 2 and 5 have been superimposed in FIG. 5 to show the missing acid peak after imidization.

If the peak due to the acid group overlapped with the peak of the 5-membered succinimide group around 1712 cm$^{-1}$ in Compound 2, it should have been clearly visible in Compound 5 where the imide group peak shifted to 1682 cm$^{-1}$ and vice versa.

The decarboxylation reaction during imidization via reactive extrusion was further confirmed by imidization of styrene/maleic anhydride (MA) copolymer (14% MA) with 4-aminobenzoic acid in solution. It was found that the decarboxylation did not take place in solution based on the presence of an aromatic acid peak in the IR spectrum.

COMPARATIVE EXAMPLE 5

This example describes the preparation of a styrene/N-phenylsuccinimide-4-carboxylic acid copolymer.

Figure 6:
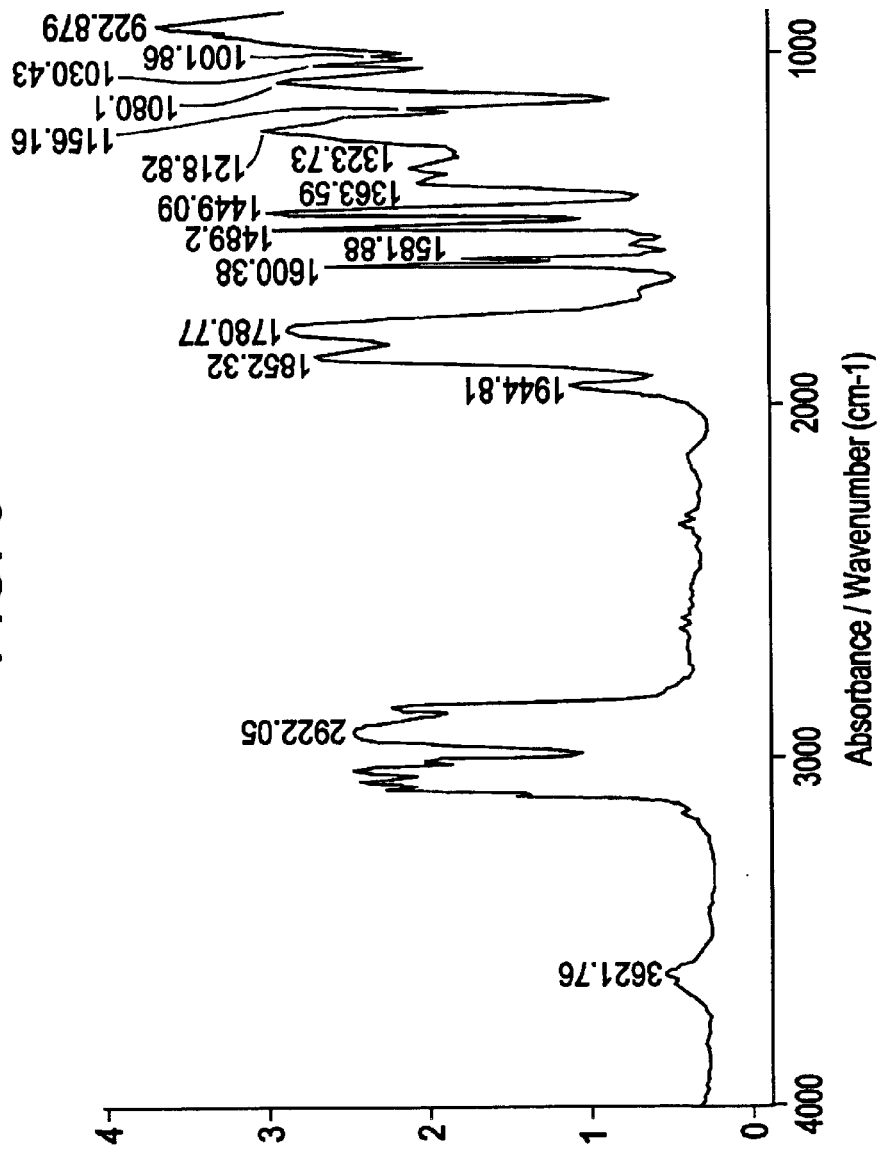
FIG. 6 shows the IR spectrum of styrene/maleic anhydride (Compound 6).
Figure 7:
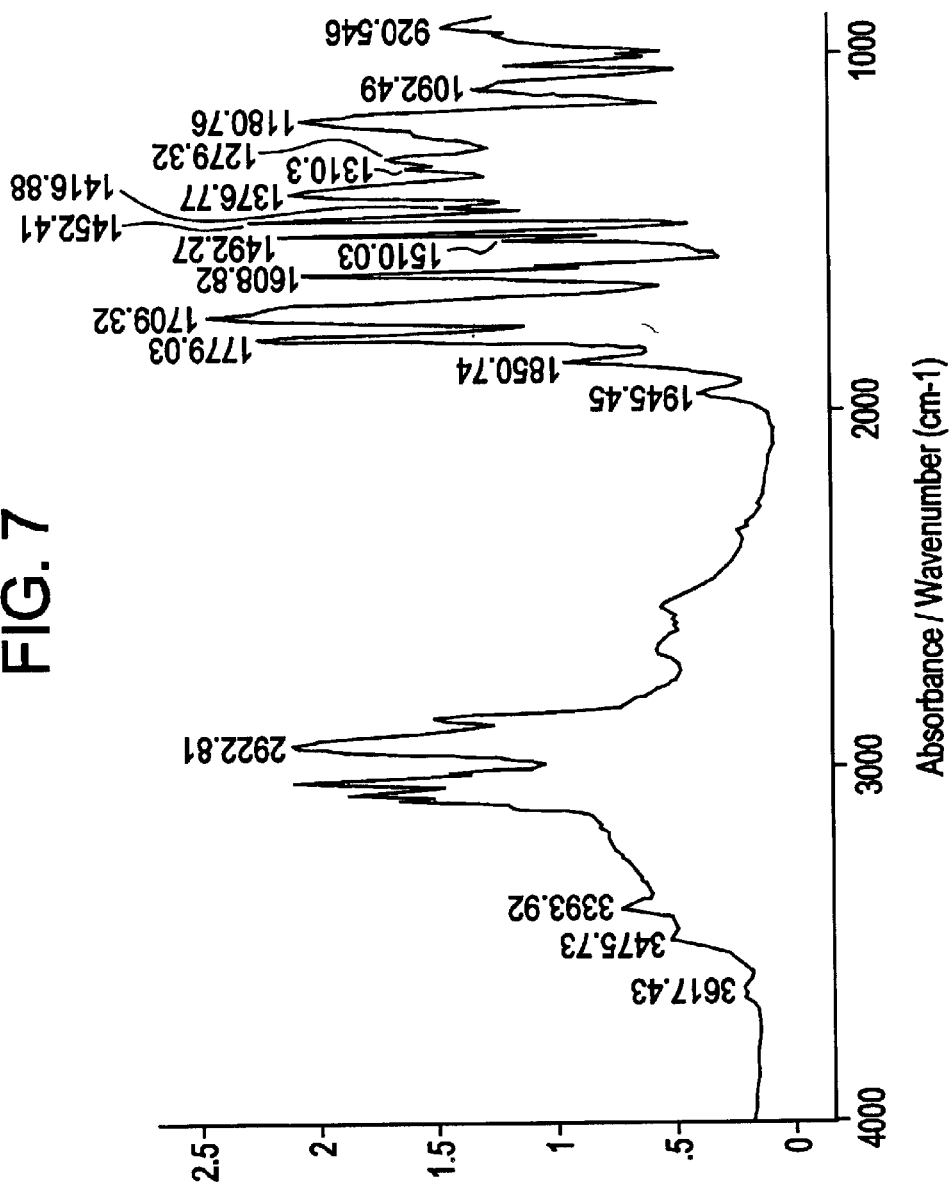
FIG. 7 shows the IR spectrum of styrene/N-phenylsuccimimide-4-carboxylic acid copolymer (Compound 7).

Styrene/maleic anhydride (14%) copolymer (SMA) (Compound 6), commercially available from Aldrich Chemical Company, was used at the starting material. A mixture of 50 g SMA copolymer and 10 g 4-aminobenzoic acid was refluxed in 250 ml xylene in a 500 ml round bottom flask equipped with a Dean Stark apparatus to remove the water from the imidization reaction. The refluxing was continued for 6 hours, and the contents were cooled and poured into methanol (1000 ml). A small portion of the solid precipitated and was filtered and washed with methanol several times to remove unreacted 4-aminobenzoic acid. The precipitate was dried in a vacuum oven at 100° C. for 18 hours and was analyzed by IR spectroscopy for the presence of an aromatic acid peak. The aromatic acid peak can be clearly be detected at 1692 cm$^{-1}$ (FIG. 6 and 7) along with the peaks due to imide groups at 1714 cm$^{-1}$ and 1779 cm$^{-1}$. Again, some unreacted anhydride can be detected by IR at 1779 cm$^{-1}$ and 1857 cm$^{-1}$ respectively.

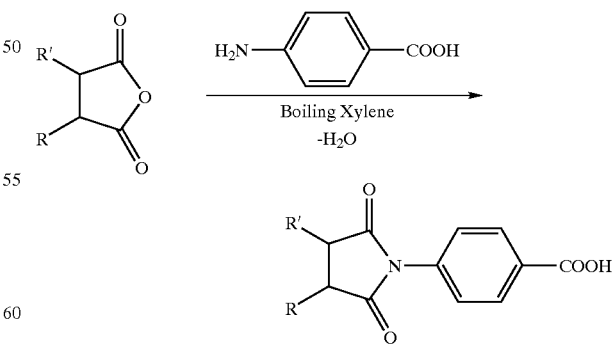

R, R' = Polystyrene units

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A process for making polymers containing N-phenyl imide groups comprising reacting polymers containing succinic anhydride or glutaric anhydride groups with a substituted or unsubstituted aminobenzoic acid in a devolatilizing extruder at a barrel temperature of about 180° to about 320° C., whereby complete decarboxylation takes place during formation of the N-phenylimide groups.

2. The process of claim 1 wherein the aminobenzoic acid is p-aminobenzoic acid.

3. The process of claim 1 wherein the polymer containing anhydride groups is polypropylene grafted with poly (styrene/α-methylstyrene/succinic anhydride).

4. The process of claim 1 wherein the polymer containing anhydride groups is polypropylene grafted with poly (glutaric anhydride).

5. The process of claim 1 wherein the polymer containing anhydride groups is a styrene/succinic anhydride copolymer.

* * * * *